United States Patent [19]

Sinyard

[11] Patent Number: 4,466,629
[45] Date of Patent: Aug. 21, 1984

[54] BICYCLE HEADSET INCLUDING A STEM SEAL

[76] Inventor: Michael W. Sinyard, 844 Jury Ct., San Jose, Calif. 95112

[21] Appl. No.: 504,870

[22] Filed: Jun. 16, 1983

Related U.S. Application Data

[63] Continuation-in-part of Ser. No. 397,589, Jul. 12, 1982.

[51] Int. Cl.³ ............................................. B62K 21/06
[52] U.S. Cl. ................................. 280/279; 308/187.1; 384/138; 384/152
[58] Field of Search .............................. 280/279, 280; 308/187.1, 187.2; 384/138, 151, 152, 153; 277/12, 32, 177

[56] References Cited

U.S. PATENT DOCUMENTS

| | | | |
|---|---|---|---|
| 2,674,012 | 4/1954 | Noelting | 308/187.1 |
| 4,068,858 | 1/1978 | Harrison et al. | 280/279 |
| 4,189,167 | 2/1980 | Dubois | 280/279 |
| 4,303,257 | 12/1981 | Perotti et al. | 280/279 |

FOREIGN PATENT DOCUMENTS 1415 of 1926 Australia .............................. 280/279

Primary Examiner—Joseph F. Peters, Jr.
Assistant Examiner—D. Lynn Fugate
Attorney, Agent, or Firm—Hamrick, Hoffman, Guillot & Kazubowski

[57] ABSTRACT

An improved bicycle headset is disclosed having ball bearing races sealed by O-rings against contamination by dust, dirt, moisture and the like. This bicycle headset includes a lower assembly comprising a lower cup fitted to the lower end of a head tube, a crown cone upon which the shoulder of a front fork bears, a lower ball bearing race positioned between the lower cup and the crown cone, and a lower O-ring seal mounted on the crown cone to isolate the lower ball bearing race from the external environment. Also included, is an upper headset assembly comprising an upper stationary cone fitted to the upper end of the head tube and an upper cup threadedly attached to the upper end of a fork tube. A weatherproof lock nut is tightened down against the top portion of said upper cup so as to lock the position of the upper cup on the fork tube about a handlebar stem, and seal the upper part thereof. An upper ball bearing race is positioned between the upper stationary cone and the upper cup, and an upper O-ring seal mounted on the upper stationary cone below the ball bearing race, to isolate the upper ball bearing race from the external environment.

7 Claims, 7 Drawing Figures

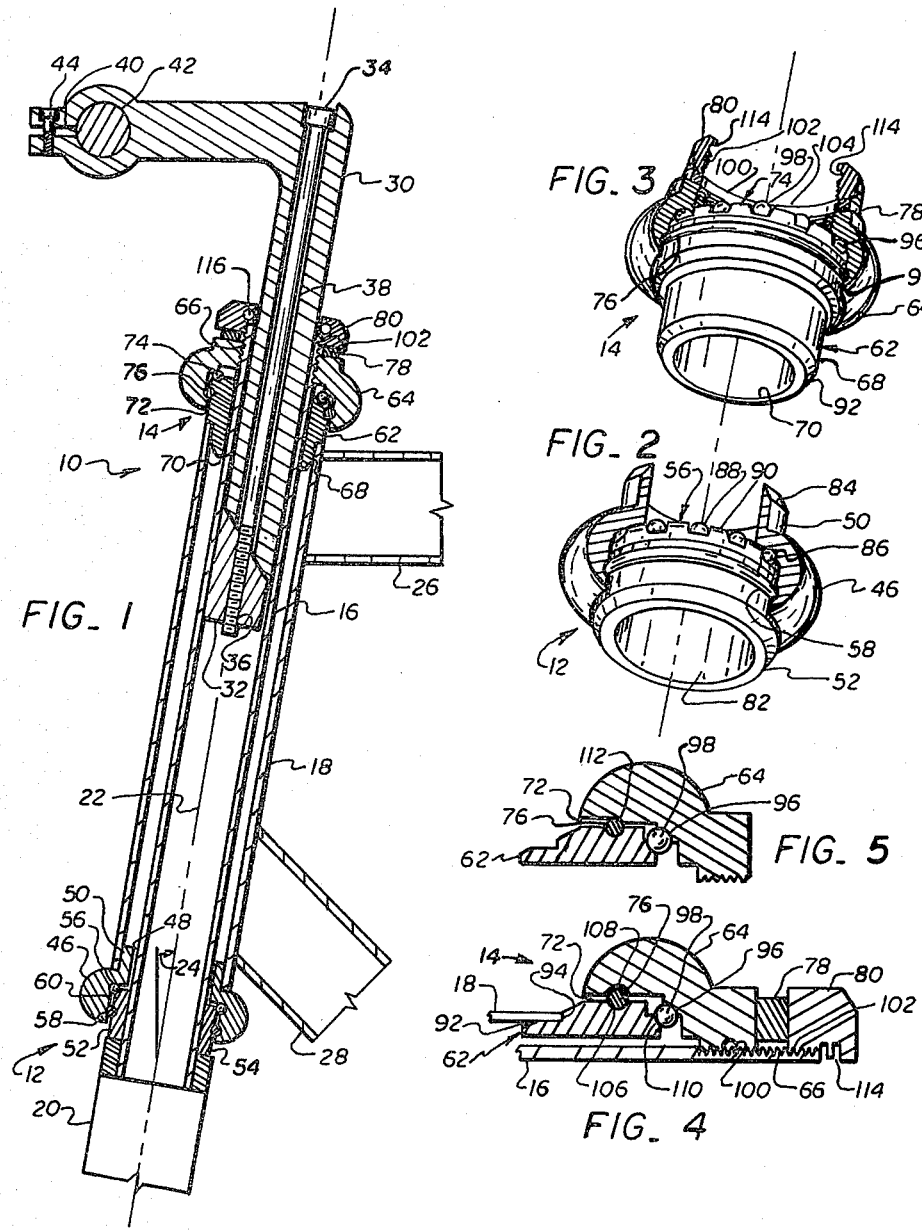

# 4,466,629

BICYCLE HEADSET INCLUDING A STEM SEAL

CROSS REFERENCE TO RELATED APPLICATION

This application is a continuation-in-part of applicant's application Ser. No. 397,589, filed July 12, 1982.

BACKGROUND OF THE INVENTION

1. Field of the Invention

The present invention relates generally to bicycle steering head apparatus and specifically to an improved moisture sealed headset for use therewith.

2. Description of the Prior Art

A bicycle is typically provided with steering head apparatus to allow steering by rotation of the front wheel about a steering axis defined by a head tube mounted to the frame of the bicycle. In such a typical bicycle, the axle of the front wheel is attached to a front fork assembly which includes a fork tube which can rotate within the head tube.

A ball bearing headset is also typically provided to minimize friction between the head tube and the fork tube. This ball bearing headset includes lower and upper headset assemblies which position the fork tube with respect to the head tube while allowing rotation of the fork tube and the attached front fork about the steering axis. Both the lower and upper headset assemblies include ball bearings to minimize friction. To function properly, the headset must be capable of transferring weight from the frame of the bicycle to the front fork while allowing the front fork to rotate freely about the steering axis. By virtue of their mounting location in the front of bicycles, headsets are exposed to a range of dust, dirt and moisture. In prior art headsets, these ball bearings are not sealed, thus bearing failures due to dust and dirt contamination and corrosion are common.

What is needed, therefore, is a headset with a seal for the ball bearing thereby increasing service life of the headset.

In my copending application a seal was located exteriorilly of, and below the ball bearing for both the lower and upper headset assemblies. With respect to the lower headset assembly, the position of the seal was effective in minimizing the adverse effects caused by the presence of dirt, dust and moisture. However, the upper part of the upper assembly was not sealed. Thus, dirt, dust and moisture could enter and adversely affect operation of the upper headset assembly.

A primary object of this invention is to provide a bicycle headset that will operate reliably under road conditions characterized by dust, dirt and moisture.

An additional object of this invention is to provide a bicycle headset having ball bearings that are isolated from the external environment by a seal.

These and other objects, which will become apparent, are accomplished in accordance with the illustrated preferred embodiment of this invention by providing an improved bicycle headset having ball bearings with O-ring seals to protect those ball bearings against contamination.

SUMMARY OF THE PRESENT INVENTION

This improved bicycle headset includes a lower headset assembly comprising a lower cup fitted to the lower end of a head tube, a crown cone upon which the shoulder of a front fork bears, a lower ball bearing positioned between the lower cup and the crown cone, and a lower O-ring seal mounted on the crown cone to isolate the lower ball bearing from the external environment.

Also included, is an upper headset assembly comprising an upper stationary cone fitted to the upper end of the head tube, an upper cup threadly attached to the upper end of a fork tube, a washer and a waterproof lock nut, including an O-ring seal which seals as well as locks the position of the upper cup on the fork tube, an upper ball bearing positioned between the upper stationary cone and the upper cup, and an upper O-ring seal mounted on the upper stationary cone below the upper ball bearing, to isolate the internal parts of the headset from the external environment.

IN THE DRAWING

FIG. 1 is a sectional view of a bicycle steering head apparatus employing a headset according to the present invention;

FIG. 2 is an isometric view, partially in section of a lower portion of the headset illustrated in FIG. 1;

FIG. 3 is an isometric view, partially in section, of an upper portion of the headset illustrated in FIG. 1;

FIG. 4 is a partial sectional view of the upper portion of the headset of FIG. 1;

FIG. 5 is a partial sectional view of an alternative embodiment of the upper portion of the headset of FIG. 1;

DESCRIPTION OF THE PREFERRED EMBODIMENT

Figure 6:
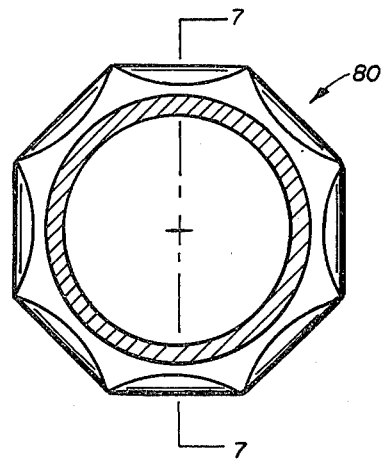
FIG. 6 is a top plan view of a waterproof lock nut (80) employed to seal the stem.
Figure 7:
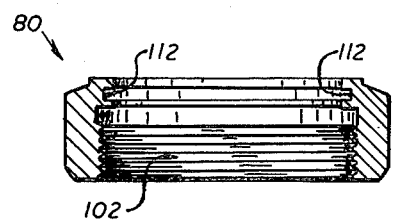
FIG. 7 is a cross-section view of waterproof lock nut (80) taken along the lines 7—7 of FIG. 6.

The advantage of the present invention is that it seals the ball bearings as well as the stems, thus improving bearing life by preventing contamination from dust, dirt or moisture. Other objects and advantages of the present invention will become apparent to those skilled in the art after having read the following detailed description of the preferred embodiments with reference to the attached drawings.

Referring to FIG. 1, there is shown a bicycle steering head apparatus 10 utilizing an improved headset according to the preferred embodiment of the present invention.

Specifically, the headset comprises a lower headset assembly 12 and an upper headset assembly 14 and serves to axially position a fork tube 16 and an attached front fork 20, which supports a front wheel (not illustrated), about a steering axis 22 so as to provide means for steering a bicycle. Orientation of the steering axis 22, which is colinear with the axis of the cylindrical head tube, 18, is preferably at an angle 24 from the vertical as illustrated for dynamic stability of the bicycle. Positioning of the head tube 18 is provided by welding or fastening the head tube to a top tube 26 and a down tube 28 which comprises a portion of the bicycle frame.

A handlebar stem 30 is detachably coupled to the inner wall of the fork tube 16 by a wedge 32. To lock the handlebar stem 30 in position, a stem expander bolt 34 is threaded into a threaded hole 36 in the wedge 32, thereby causing a lateral shift of the wedge and the handlebar stem 30 to force them into contact with the inner wall of the fork tube 16. A clearance hole 38 in the handlebar stem 30 is sized to permit the stem expander bolt 34 to also shift laterally. Repositioning or removal of the handlebar stem 30 is accomplished by first loosening the stem expander bolt 34 which allows the wedge 32 to contract from the inner wall of the fork tube 16 which then permits axial movement of the handlebar stem. Handlebars 40 are attached to the handlebar stem 30 by clamping in a clamp 42 which is tightened or loosened by a clamping bolt 44. In operation, the handlebars 40 provide means for a bicycle rider to exert a torque on the fork tube 16 and front fork 20 for steering.

Axial positioning of the fork tube 16 and load transfer from the bicycle frame to the front fork 20 is accomplished by the headset which comprises the lower and upper headset assemblies 12 and 14. The lower headset assembly 12 comprises an axially symmetrical lower cup 46 having an axial clearance hole 48 for the fork tube 16 and a cylindrical seat 50 sized to permit a press fit of the lower cup into the lower end of the head tube 18. The lower headset assembly 12 also comprises an axially symmetrical crown cone 52 located on the lower end of the fork tube 16 at a position to allow contact with a shoulder 54 of the front fork 20. Additionally, the lower headset assembly 12 comprises a lower ball bearing 56 located between the lower cup 46 and the crown cone 52 and a lower O-ring seal 58 carried by the crown cone 52. Positioning of the crown cone 52 with respect to the lower cup 46 is provided by the lower ball bearing 56 which also transmits compressive loads between the lower cup and the crown cone while allowing rotation of the crown cone about the steering axis 22. An annular chamber 60 exists between the lower cup 46 and the crown cone 52 to permit the crown cone to rotate freely. Environmental sealing of the lower ball bearing 56 is provided by the lower O-ring seal 58 which is located in the annular chamber 60 at a position exterior to the lower ball bearing 56. This lower O-ring seal 58 prevents dust and dirt and other contaminants from damaging the lower ball bearing 56. This is effective because the upper part of the lower headset assembly is sealed as a cylindrical seat 50 is sized to permit a press fit of the lower cup into the lower end of the head tube 18.

Located at the upper end of the head tube 18, the upper headset assembly 14 comprises an axially symmetrical upper stationary cone 62 which is coupled to the head tube and also comprises an axially symmetrical upper cup 64 which is threadedly engaged to a threaded end 66 of the fork tube 16.

A cylindrical seat 68 is provided on the upper stationary cone 62 to allow a press fit into the upper end of the head tube 18. An axial clearance hole 70 in the upper stationary cone 62 allows the fork tube 16 to freely rotate therethrough. As installed, the upper stationary cone 62 and the upper cup 64 form an annular chamber 72 therebetween with an upper ball bearing 74 and an upper O-ring seal 76 installed therein. The upper ball bearing 74 positions the upper cup 64 with respect to the upper stationary cone 62 while permitting rotation of the upper cup and the attached fork tube 16 about the steering axis 22.

During the assembly of the bicycle steering head apparatus 10, as described above, the upper cup 64 is threaded onto the threaded end of 66 of the fork tube 16 to provide a pre-load force which draws the shoulder 54 of the front fork 20 into contact with the crown cone 52. This action insures a proper seating of the lower cup 46 and the upper stationary cone 62 in the head tube 18 and eliminates clearances between ball bearings 56 and 74 and their corresponding cups 46 and 64 and cones 52 and 62. Once the upper cup 64 has been threaded to the proper location, a washer 78 is installed on the fork tube 16 over the upper cup and a waterproof lock nut 80 is threaded onto the threaded end 66 of the fork tube to seal and lock the upper cup in that location. Waterproof lock 80 includes an O-ring seal 116 which is positioned above the fork tube upper end and acts to seal the upper part of the stem.

FIG. 2 shows the lower headset assembly 12 in more detail. The crown cone 52 includes an axial hole 82 of a diameter that permits the fork tube 16 to be passed therethrough. The lower cup 46 includes a chamfer 84 to facilitate installation onto the lower end of the head tube 18 and also includes a bearing seat 86 used as a contact surface for balls 88 of the lower ball bearing 56. A retainer 90 is utilized to evenly space and retain the balls 88.

Further details of the upper headset assembly 14 may be seen by referring to FIG. 3. The upper stationary cone 62 includes a chamfer 92 to facilitate installation onto the upper end of the head tube 18 and a shoulder 94 used as a seat for the end of the head tube 18. The upper cup 64 includes a bearing seat 96 utilized for contacting balls 98 of the upper ball bearing 74 and also includes an internal thread 100 for engagement with the threaded end 66 of the fork tube 16. Also shown in FIG. 3 is an internal thread 102 on the waterproof lock nut 80 used for locking the upper cup 64 in position and an O-ring seat 114 used, in conjunction with O-ring seal 116, for sealing the top of the upper headset assembly from dirt, dust and moisture. A retainer 104 used for retaining and spacing the balls 98 of the upper ball bearing 74 is also shown.

The positioning of the upper headset O-ring 76 with respect to the upper stationary cone 62 and the upper cup 64 is shown in FIG. 4. An O-ring seat 106 is provided in the upper stationary cone 62 to position the upper O-ring 76 in the annular chamber 72. In this embodiment, an O-ring clearance groove 108 is provided in the upper cup 64. A clearance between the upper O-ring 76 and the upper cup 64 allows the upper cup to rotate freely with no seal drag. Particulates such as dust and dirt are prevented from moving up the annular chamber 72 and contaminating the upper ball bearing race 74. Also shown in FIG. 4 is a bearing seat 110 portion of the upper stationary cone 62 which provides means for positioning the upper ball bearing 74.

An alternative embodiment of the present invention, shown in FIG. 5, incorporates another method of sealing the bearings. An O-ring seal seat 112 in the upper cup 64 provides contact with the upper O-ring 76 to positively seal the upper ball bearing 74 from all contaminants including moisture. While this is a very effective sealing technique, one disadvantage is the torque necessary to overcome friction between the upper O-ring seal 76 and the upper cup 64.

As will be clear to those skilled in the art, modifications and changes may be made to the disclosed embodiments without departing from the inventive concepts thereof. The above description is intended as illustrative and informative but not limiting in scope. Accordingly, it is intended that the following claims be interpreted to cover all modifications that reasonably fall within the scope of the invention.

What is claimed is:

1. A headset for use in steering a single wheel of a multi-wheeled vehicle, such as a bicycle, comprising:

a head tube, fixedly attached to said vehicle in an approximately vertical orientation, having an open cavity therethrough that is bounded by an upper end and a lower end;

wheel support means for rotatably coupling said single wheel to said vehicle, said wheel support means comprising a wheel support tube positioned in said open cavity and protruding through said upper end of said head tube, and also comprising a shoulder located below said lower end of said head tube;

lower bearing means for rotatably coupling said wheel support means to said head tube, said lower bearing means comprising a lower cup coupled to said lower end of said head tube, a crown cone coupled to said shoulder of said wheel support means and forming a first annular chamber between said lower cup and said crown cone, a first bearing located within said first annular chamber for transferring a portion of the weight of said vehicle from said lower cup to said crown cone, and first sealing means coupled to said crown cone for sealing said first annular chamber at a position exterior to said first bearing;

upper bearing means for rotatably coupling said wheel support means to said head tube, said upper bearing means comprising an upper stationary cone coupled to said upper end of said head tube and having a perforation therethrough allowing said wheel support tube to protrude through said upper stationary cone, an upper cup coupled to the portion of said wheel support tube that protrudes through said upper stationary cone and forming a second annular chamber between said upper stationary cone and said upper cup, a second bearing located within said second annular chamber for rotatably coupling said upper stationary cone and said upper cup, and second sealing means coupled to said upper stationary cone for sealing said second annular chamber at a position exterior to and below said second bearing;

handlebar means, including a stem coupled to said wheel support tube, for applying a torque for rotating said wheel support means;

means for locking the elements of said upper bearing means in operating position, whereby an annular aperature exists between the interior of said locking means and said stem; and third sealing means for sealing said annular aperature.

2. A headset as recited in claim 1 wherein said first sealing means comprises a first O-ring of an elastomeric material fitted into a groove in said crown cone and wherein said second sealing means comprises a second O-ring of an elastomeric material fitting into a groove in said upper stationary cone.

3. A headset as recited in claim 2 further comprising a groove in said lower cup adjacent to said first O-ring and comprising a groove in said upper cup adjacent to said second O-ring.

4. A headset as recited in claim 3, wherein said wheel support tube comprises external screw threads and said upper cup comprises mating internal screw threads thereby allowing said upper cup to be threadedly coupled to said wheel support tube.

5. A headset as recited in claim 4 wherein said locking means comprises a lock nut which has internal threads that mate with the external threads of said support tube for locking the position of said upper cup with respect to said wheel support tube about said stem.

6. A headset as recited in claim 5 wherein said third sealing means includes an O-ring groove in said lock nut adjacent the top of the nut, said groove being fitted with an O-ring made of elastomeric material.

7. A headset as recited in claim 4 wherein said first and second bearings are ball bearings.

* * * * *